United States Patent
Lu et al.

(10) Patent No.: US 9,399,323 B1
(45) Date of Patent: Jul. 26, 2016

(54) THREE-DIMENSIONAL PRINTING STRUCTURE

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Ting-Yu Lu, New Taipei (TW); Hsuan-Chen Yeh, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 14/803,127

(22) Filed: Jul. 20, 2015

(30) Foreign Application Priority Data

May 11, 2015 (CN) .......................... 2015 1 0236597

(51) Int. Cl.
*B29C 35/08* (2006.01)
*B29C 67/00* (2006.01)
*B33Y 30/00* (2015.01)

(52) U.S. Cl.
CPC ............. *B29C 67/0092* (2013.01); *B33Y 30/00* (2014.12)

(58) Field of Classification Search
CPC .................................................. B29C 67/0092
USPC ................... 425/470; 264/401, 497, 212, 308
See application file for complete search history.

(56) References Cited

U.S. PATENT DOCUMENTS

| 7,364,686 B2 | 4/2008 | Kritchman et al. |
| 7,625,512 B2 * | 12/2009 | Cruz-Uribe ......... B29C 67/0066 264/308 |
| 2005/0069784 A1 * | 3/2005 | Gothait ............... B29C 67/0059 430/5 |
| 2016/0136888 A1 * | 5/2016 | Bayley ................ C09B 67/0097 424/450 |

FOREIGN PATENT DOCUMENTS

| DE | 19954891 A1 * | 5/2001 | .......... B29C 67/0066 |
| JP | 3698460 B2 * | 9/2005 | .......... B29C 67/0092 |

* cited by examiner

*Primary Examiner* — Timothy Kennedy
(74) *Attorney, Agent, or Firm* — Jianq Chyun IP Office

(57) ABSTRACT

A three-dimensional (3D) printing structure that includes an object and a support member is provided. The support member is located on one side of the object to support the object. The support member includes a plurality of support bricks and a filler. The support bricks are stacked together. A first portion of the filler fills the space among the support bricks, and a second portion of the filler fills the space between the object and the support bricks adjacent to the object. Accordingly, the support member of the 3D printing structure is able to support the object, and thus the object can be formed through 3D printing.

10 Claims, 4 Drawing Sheets

THREE-DIMENSIONAL PRINTING STRUCTURE

CROSS-REFERENCE TO RELATED APPLICATION

This application claims the priority benefit of China application serial no. 201510236597.4, filed on May 11, 2015. The entirety of the above-mentioned patent application is hereby incorporated by reference herein and made a part of the specification.

FIELD OF THE INVENTION

The invention relates to a three-dimensional (3D) structure; more particularly, the invention relates to a 3D printing structure.

DESCRIPTION OF RELATED ART

With recent development of science and technologies, various methods of building three-dimensional (3D) models by applying the additive manufacturing technology have been proposed. In general, according to the additive manufacturing technology, design data of the 3D models created by computer aided design (CAD) or other software are converted into a plurality of thin (quasi-two-dimensional, quasi-2D) cross-sectional layers which are successively stacked. The technologies of forming plural thin cross-sectional layers have also been proposed.

For instance, the printing module of a 3D printing apparatus may move along an X-Y plane above the base according to the spatial coordinates XYZ of the design data of the 3D model, such that the materials for constructing the model can be properly shaped as cross-sectional layers. The deposited materials for constructing the model can then be naturally hardened or cured by heat or by irradiation from a light source, so as to form the required cross-sectional layers. As long as the printing module moves along the Z axis in a layer-by-layer manner, the cross-sectional layers can be stacked together along the Z axis, and 3D object can then be formed after the deposited materials for constructing the model are cured layer by layer.

According to the technology of forming the 3D object by using the materials cured by the irradiation from the light source, for instance, the printing module is adapted to be submerged into shaping materials in liquid form in a tank, and the light source module irradiates the liquid shaping materials along the X-Y plane, such that the liquid shaping materials are cured and stacked onto a movable platform of the printing module. After the movable platform of the printing module is moved along the Z axis in a layer-by-layer manner, the liquid shaping materials can be cured layer by layer and can then be stacked to form the 3D object.

However, the object constructed by applying the 3D printing technology may be of different shapes; if the lower portion of the object is smaller than the upper portion of the object, the model of the to-be-shaped object may collapse during the printing process due to lack of sufficient support.

SUMMARY OF THE INVENTION

The invention is directed to a three-dimensional (3D) printing structure including a support member capable of supporting an object, and the support member has support bricks that are stacked together, so as to enhance the support strength.

In an embodiment of the invention, a 3D printing structure that includes an object and a support member is provided. The support member is located on one side of the object to support the object. The support member includes a plurality of support bricks and a filler. The support bricks are stacked together. A first portion of the filler fills space among the support bricks, and a second portion of the filler fills space between the object and the support bricks adjacent to the object.

According to an embodiment of the invention, the second portion of the filler includes two surfaces opposite to each other, the two surfaces are respectively adhered to the object and the corresponding support bricks, and profiles of the two surfaces conform to an outer profile of the object.

According to an embodiment of the invention, hardness of the support bricks is greater than hardness of the filler.

According to an embodiment of the invention, a material of the object is the same as a material of the support bricks.

According to an embodiment of the invention, the support bricks are of multiple sizes.

According to an embodiment of the invention, densities of the support bricks are different in different areas of the support member.

According to an embodiment of the invention, the support bricks are stacked to form a structure having a plurality of layers with different horizontal planes, and the support bricks in two adjacent layers of the layers are aligned or alternately arranged.

According to an embodiment of the invention, the support member is located below or on a side surface of the object, and a projection of the object on a horizontal plane is located within a projection of the support member on the horizontal plane.

According to an embodiment of the invention, the 3D printing structure further includes a bottom plate, and the object and the support member are arranged on the bottom plate.

According to an embodiment of the invention, the bottom plate includes a second rigid layer and a second flexible layer stacked on the second rigid layer, and the object and the support member are arranged on the second flexible layer.

According to an embodiment of the invention, the bottom plate includes a rigid area and a flexible area, the rigid area is in contact with the support member, and the flexible area is in contact with the object.

In view of the above, the support member of the 3D printing structure is able to support the object, and thus the object can be formed through 3D printing. The support member is constituted by the support bricks that are stacked together. The first portion of the filler fills the space among the support bricks, and the second portion of the filler fills the space between the object and the support bricks adjacent to the object. The great hardness of the support bricks is conducive to an improvement of the overall strength of the support member. Besides, a material of the filler is softer than a material of the object and a material of the support bricks; hence, if the second portion of the filler is located between the object and the support bricks, it is rather easy for the support member to be separated from the object. The material of the object may be the same as the material of the support bricks; that is, as long as the relative locations of the object, the support bricks, and the filler in each layer are determined, the object and the support member can be simultaneously formed by using two different materials characterized by different levels of photo-sensitivity. The support bricks can be of the same size or of different sizes according to actual demands; alternatively, the densities of the support bricks in different areas of the support member may be different. The support bricks are stacked to form a structure having a plurality of layers with different horizontal planes, and the support bricks in two adjacent layers are aligned or alternately arranged.

In addition, the 3D printing structure may include a bottom plate located below the object and the support member. The bottom plate can be constituted by the second rigid layer and the second flexible layer that are stacked together. The second rigid layer may be in contact with the platform of the 3D printing structure, such that the adhesion between the platform and the second rigid layer can be enhanced; the second flexible layer may be in contact with the object and the support member, such that the object and the support member can be easily separated from the platform. Alternatively, the bottom plate may have the single-layer structure, and the portion of the bottom plate corresponding to the object is the flexible area, such that the object can be easily separated from the platform.

To make the above features and advantages of the present invention more comprehensible, several embodiments accompanied with drawings are described in detail as follows.

DETAILED DESCRIPTIONS OF EMBODIMENTS

Figure 1:
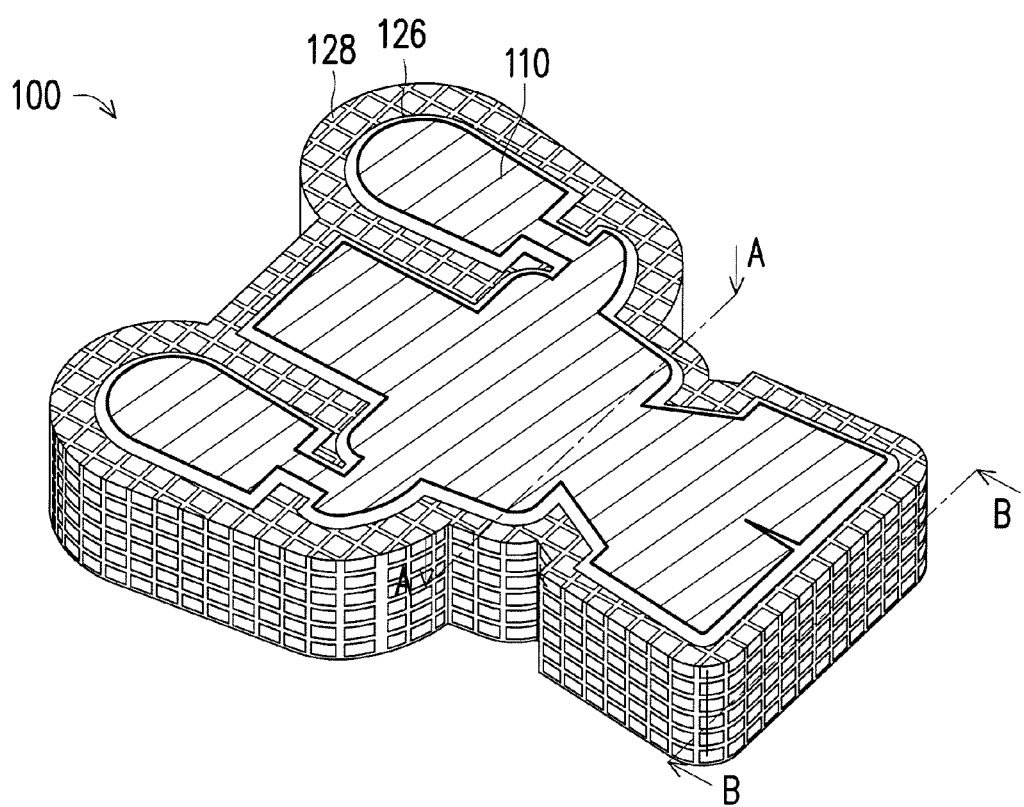
FIG. 1 is a schematic three-dimensional (3D) view illustrating a 3D printing structure according to an embodiment of the invention.
Figure 2:
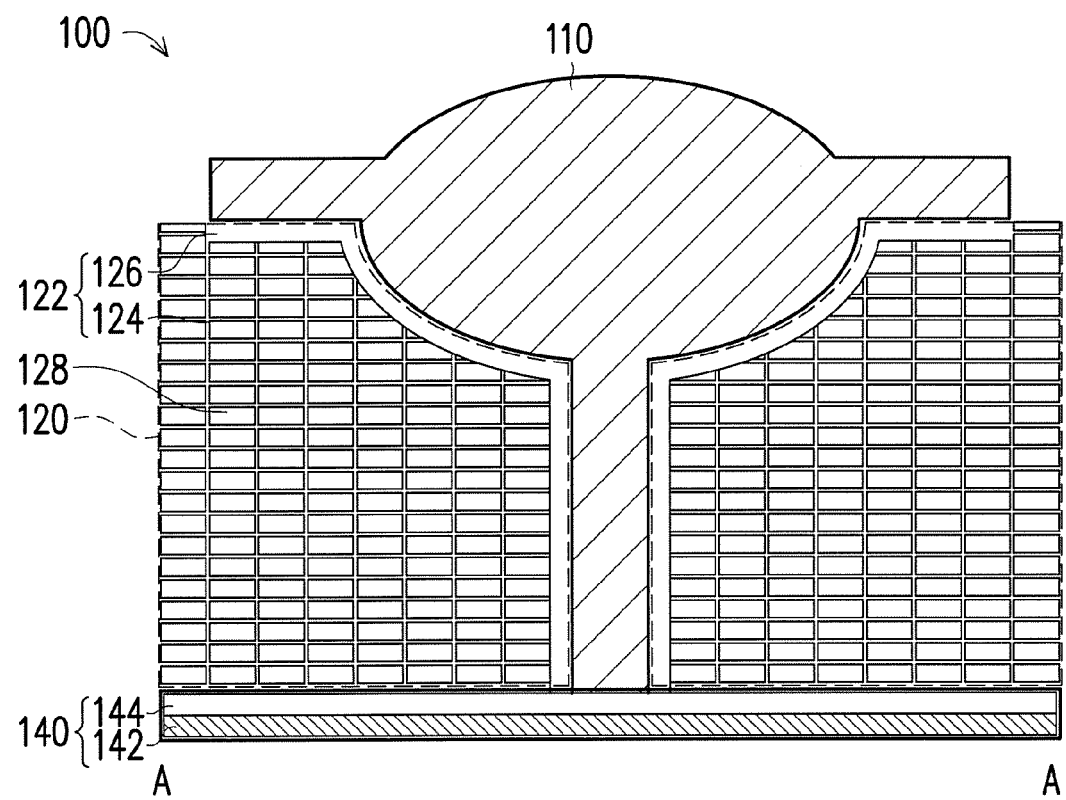
FIG. 2 is a schematic cross-sectional view illustrating the 3D printing structure depicted in FIG. 1 along a line segment A-A.
Figure 3:
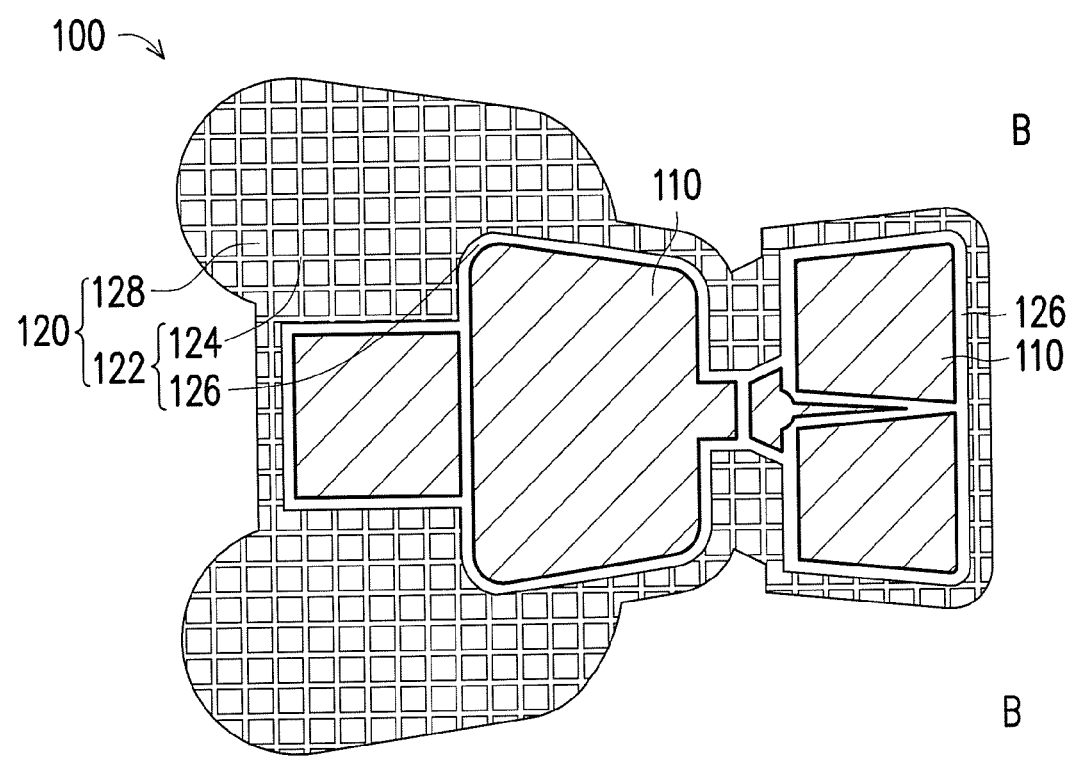
FIG. 3 is a schematic cross-sectional view illustrating the 3D printing structure depicted in FIG. 1 along a line segment B-B.

FIG. 1 is a schematic three-dimensional (3D) view illustrating a 3D printing structure according to an embodiment of the invention. FIG. 2 is a schematic cross-sectional view illustrating the 3D printing structure depicted in FIG. 1 along a line segment A-A. FIG. 3 is a schematic cross-sectional view illustrating the 3D printing structure depicted in FIG. 1 along a line segment B-B.

With reference to FIG. 1 to FIG. 3, the 3D printing structure 100 provided in the present embodiment of the invention includes an object 110 and a support member 120 located on one side of the object 110 to support the object 110. In the present embodiment, the object 110 is the desired final product. Since the object 110 may be of different shapes, the area of the lower cross-sectional planes of the object 110 may be smaller than the area of the upper cross-sectional planes of the object 110, the model of the object 110 may collapse during the printing process due to lack of sufficient support. To prevent said issue, in the printing process, the object 110 can be formed together with the support member 120, and the support member 120 located below or on the side of the object 110 can support the object 110 that grows in an upward manner.

The object 110 is the desired final product; therefore, after the 3D printing structure 100 is formed, the support member 120 need be separated from the object 110; in order to easily separate the support member 120 from the object 110, a material of the support member 120 is softer than a material of the object 110. However, the hardness of the support member 120 should be sufficient to support the object 110.

In the present embodiment, the support member 120 includes a plurality of support bricks 128 and a filler 122. Hardness of the support bricks 128 is greater than hardness of the filler 122. The support bricks 128 are stacked together. A first portion 124 of the filler 122 fills the space among the support bricks 128, and a second portion 126 of the filler 122 fills the space between the object 110 and the support bricks 128 adjacent to the object 110. Owing to the support bricks 128 stacked together, the overall hardness of the support member 120 described herein can be effectively enhanced, and thus the support bricks 128 may achieve the function similar to that accomplished by bricks used in construction. Besides, a material of the filler 122 is softer than a material of the object 110 and a material of the support bricks 128; hence, if the second portion 126 of the filler 122 is located between the object 110 and the support bricks 128, it is rather easy for the support member 120 to be separated from the object 110.

According to the present embodiment, a material of the object 110 is the same as a material of the support bricks 128. Therefore, in the 3D printing structure 100, as long as the relative locations of the object 110, the support bricks 128, and the filler 122 in each layer on different Z axes are determined, the object 110 and the support member 120 can be simultaneously formed by using two different materials characterized by different levels of photo-sensitivity. More particularly, only two nozzles respectively holding materials characterized by different levels of photo-sensitivity are required by a 3D printing apparatus for forming the 3D printing structure 100 described herein. Manufacturers may analyze the relative locations of the object 110, the support bricks 128, and the filler 122 in each layer on different Z axes in advance and input the analyzed information into the 3D printing apparatus. Once the 3D printing apparatus performs the printing process, the 3D printing apparatus can be aware that the material with the high level of photo-sensitivity should be sprayed onto some areas, and the material with the low level of photo-sensitivity should be sprayed onto the other areas. After irradiation, the hardness of the material with the high level of photo-sensitivity is greater than the hardness of the material with the low level of photo-sensitivity, the object 110 and the support bricks 128 can be made of the material with the high level of photo-sensitivity, and the filler 122 can be made of the material with the low level of photo-sensitivity.

Certainly, in other embodiments of the invention, the object 110 and the support bricks 128 can be made of different materials, and thus the 3D printing apparatus can be equipped with three nozzles that respectively spray materials for forming the object 110, the filler 122, and the support bricks 128.

Besides, the manufacturers may change the densities of the support bricks 128 in the support member 120 according to the required strength of the support member 120. Specifically, while one of the cross-sections of the 3D printing structure 100 is being printed, the unit moving distance of each nozzle of the 3D printing apparatus (not shown) is one pixel. During printing, the nozzle may spray the materials to form the support bricks 128, and the sprayed materials are spaced from one another by one pixel, two pixels, or more pixels on the cross-section. The material for forming the filler 122 is sprayed onto the areas where no material for forming the support bricks 128 is sprayed. Thereby, the densities of the support bricks 128 in the support member 120 can be adjusted.

Besides, in the present embodiment, the densities of the support bricks 128 in the entire support member 120 remain consistent; i.e., the distance between every two adjacent support bricks 128 in the support member 120 is equal. However, in another embodiment of the invention, the densities of the support bricks 128 in one area of the support member 120 may be different from the densities of the support bricks 128 in the other area of the support member 120. In addition, as shown in FIG. 2, in the present embodiment, the support bricks 128 are stacked to form a structure having a plurality of layers with different horizontal planes, and the support bricks 128 in every two adjacent layers are aligned; however, the support bricks 128 may be arranged in a different manner, and the arrangement of the support bricks 128 may not be limited to the arrangement described above.

In the present embodiment, the second portion 126 of the filler 122 includes two surfaces opposite to each other, and the two surfaces are respectively adhered to the object 110 and the corresponding support bricks 128. According to the present embodiment, profiles of the two surfaces of the second portion 126 respectively conform to an outer profile of the object 110, and the thickness of the second portion 126 along a direction perpendicular to the outer profile of the cross-sectional view of the object 110 at different locations stays approximately the same. It should be mentioned that the thickness of the second portion 126 of the filler 122 can be adjusted by the manufacturers according to actual demands, so as to easily separate the support member 120 from the object 110 without sacrificing the support capabilities of the support member 120.

According to the present embodiment of the invention, the 3D printing structure 100 further includes a bottom plate 140, and the object 110 and the support member 120 are arranged on the bottom plate 140. In general, the 3D printing structure 100 is formed on the platform (not shown) of the 3D printing apparatus, and the bottom plate 140 includes a second rigid layer 142 and a second flexible layer 144 stacked on the second rigid layer 142. The second rigid layer 142 may be in contact with the platform of the 3D printing structure, such that the adhesion between the platform and the second rigid layer 142 can be enhanced; the second flexible layer 144 may be in contact with the object 110 and the support member 120, such that the object 110 and the support member 120 can be easily separated from the platform.

Similarly, in the present embodiment, the material of the second rigid layer 142 can be the same as the material of the object 110 and the material of the support bricks 128, and the material of the second flexible layer 144 can be the same as the material of the filler 122; thereby, the 3D printing apparatus merely requires two nozzles for forming the 3D printing structure 100 described herein. Certainly, the material of the second rigid layer 142 may be different from the material of the object 110 and the material of the support bricks 128, and the material of the second flexible layer 144 may be different from the material of the filler 122, which should not be construed as limitations to the invention. Besides, the type of the bottom plate 140 should not be construed as a limitation to the invention. Certainly, in another embodiment of the invention, the 3D printing structure 100 may not include the bottom plate 140, i.e., the bottom plate 140 is an optical device.

As shown in FIG. 2, the support member 120 is located below or on a side surface of the object 110, and a projection of the object 110 on a horizontal plane (i.e., a plane parallel to the bottom plate 140 as provided in the present embodiment) is located within a projection of the support member 120 on the horizontal plane. To be more specific, in the present embodiment, the size of the support member 120 on the horizontal plane is greater than the maximum size of the object 110 on the horizontal plane, such that the support member 120 is more capable of supporting the object 110. Alternatively, in another embodiment of the invention, the size of the support member 120 on the horizontal plane may be equal to the maximum size of the object 110 on the horizontal plane, and the support member 120 can still perform the function of supporting the object 110 to a great extent.

Figure 4:
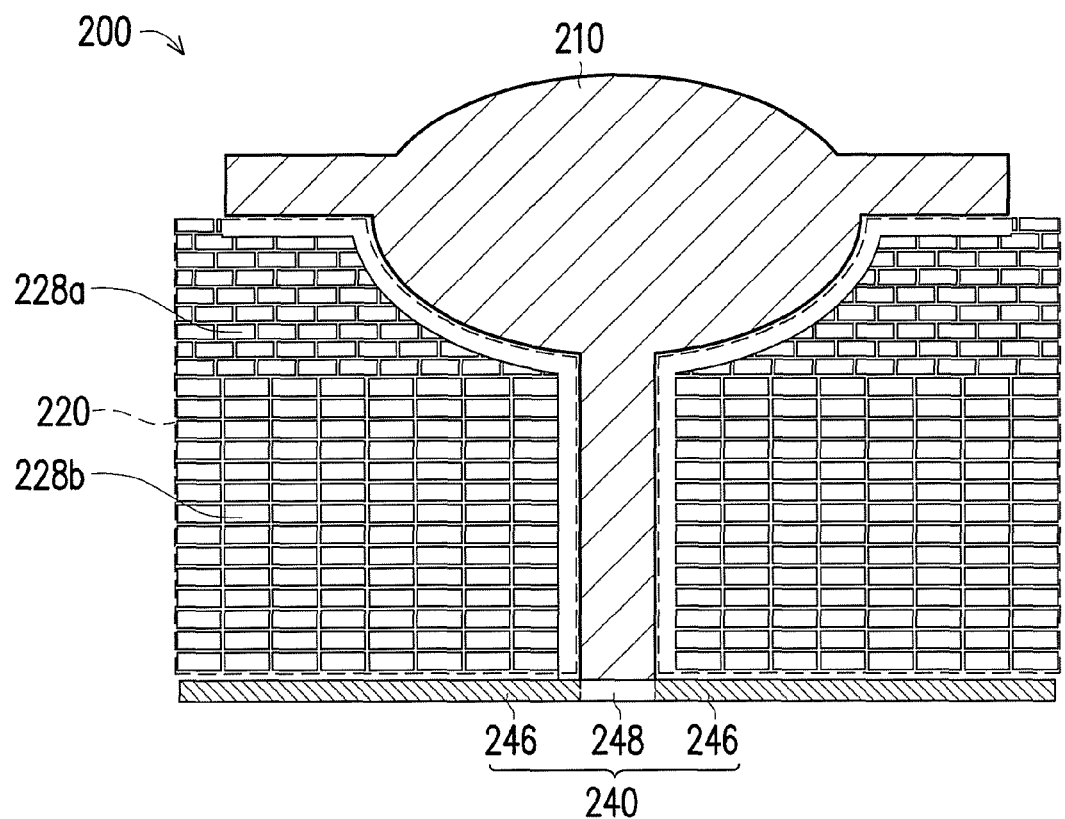
FIG. 4 is a schematic vertical cross-sectional view illustrating a 3D printing structure according to another embodiment of the invention.

FIG. 4 is a schematic vertical cross-sectional view illustrating a 3D printing structure according to another embodiment of the invention. With reference to FIG. 4, the difference between the 3D printing structure shown in FIG. 4 and the 3D printing structure shown in FIG. 2 lies in that the sizes of the support bricks 228a and 228b are different in the present embodiment, and the densities of the support bricks 228a and 228b in different areas of the support member 220 are different. In addition, the support bricks 228a in the adjacent lower and upper layers are alternately arranged, and the support bricks 228b in the adjacent lower and upper layers are aligned. In the present embodiment, the bottom plate 240 has the single-layer structure, and the bottom plate 240 includes a rigid area 246 and a flexible area 248. The rigid area 246 is in contact with the support member 220, and the flexible area 248 is in contact with the object 210. Said arrangement is beneficial for separating the object 210 from the platform.

To sum up, the support member of the 3D printing structure supports the object, and thus the object can be formed through 3D printing. The support member is constituted by the support bricks that are stacked together. The first portion of the filler fills the space among the support bricks, and the second portion of the filler fills the space between the object and the support bricks adjacent to the object. The great hardness of the support bricks is conducive to an improvement of the overall strength of the support member. Besides, the material of the filler is softer than the material of the object and the material of the support bricks; hence, if the second portion of the filler is located between the object and the support bricks, it is rather easy for the support member to be separated from the object. Moreover, the material of the object may be the same as the material of the support bricks; that is, as long as the relative locations of the object, the support bricks, and the filler in each layer are determined, the object and the support member can be simultaneously formed by using two different materials characterized by different levels of photo-sensitivity. The support bricks can be of the same size or of different sizes according to actual demands; alternatively, the densities of the support bricks in different areas of the support member may be different. The support bricks are stacked to form a structure having a plurality of layers with different horizontal planes, and the support bricks in two adjacent layers are aligned or alternately arranged.

In addition, the 3D printing structure may include the bottom plate located below the object and the support member. The bottom plate can be constituted by the second rigid layer and the second flexible layer that are stacked together. The second rigid layer may be in contact with the platform of the 3D printing structure, such that the adhesion between the platform and the second rigid layer can be enhanced; the second flexible layer may be in contact with the object and the support member, such that the object and the support member can be easily separated from the platform. Alternatively, the bottom plate may have the single-layer structure, and the portion of the bottom plate corresponding to the object is the flexible area, such that the object can be easily separated from the platform Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A three-dimensional printing structure comprising:
   an object; and
   a support member located on one side of the object to support the object, the support member comprising a plurality of support bricks and a filler, the support bricks being stacked together, wherein a first portion of the filler fills space among the support bricks, and a second portion of the filler fills space between the object and the support bricks adjacent to the object.

2. The three-dimensional printing structure of claim 1, wherein the second portion of the filler comprises two surfaces opposite to each other, the two surfaces are respectively adhered to the object and the corresponding support bricks, and profiles of the two surfaces conform to an outer profile of the object.

3. The three-dimensional printing structure of claim 1, wherein hardness of the support bricks is greater than hardness of the filler.

4. The three-dimensional printing structure of claim 1, wherein a material of the object is the same as a material of the support bricks.

5. The three-dimensional printing structure of claim 1, wherein the support bricks are of multiple sizes.

6. The three-dimensional printing structure of claim 1, wherein densities of the support bricks are different in different areas of the support member.

7. The three-dimensional printing structure of claim 1, wherein the support bricks are stacked to form a structure having a plurality of layers with different horizontal planes, and the support bricks in two adjacent layers of the layers are aligned or alternately arranged.

8. The three-dimensional printing structure of claim 1, wherein the support member is located below or on a side surface of the object, and a projection of the object on a horizontal plane is located within a projection of the support member on the horizontal plane.

9. The three-dimensional printing structure of claim 1, further comprising:
   a bottom plate, the object and the support member being arranged on the bottom plate, the bottom plate comprising a second rigid layer and a second flexible layer stacked on the second rigid layer, the object and the support member being arranged on the second flexible layer.

10. The three-dimensional printing structure of claim 1, further comprising:
   a bottom plate, the object and the support member being arranged on the bottom plate, the bottom plate comprising a rigid area and a flexible area, the rigid area being in contact with the support member, the flexible area being in contact with the object.

* * * * *